US008458094B2

(12) United States Patent
Macklin

(10) Patent No.: US 8,458,094 B2
(45) Date of Patent: *Jun. 4, 2013

(54) SECURED CHARGE CARD

(75) Inventor: James K. Macklin, Skillman, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/221,674

(22) Filed: Aug. 30, 2011

(65) Prior Publication Data

US 2012/0197799 A1     Aug. 2, 2012

Related U.S. Application Data

(60) Provisional application No. 61/436,896, filed on Jan. 27, 2011.

(51) Int. Cl.
*G06Q 40/00*     (2012.01)

(52) U.S. Cl.
USPC .............................................. 705/44; 705/35

(58) Field of Classification Search
USPC .......................................................... 705/44
See application file for complete search history.

(56) References Cited

U.S. PATENT DOCUMENTS

| 5,950,179 | A | * | 9/1999 | Buchanan et al. | 705/38 |
| 6,158,657 | A | * | 12/2000 | Hall et al. | 235/380 |
| 7,389,266 | B2 | | 6/2008 | Early et al. | |
| 7,398,919 | B2 | | 7/2008 | Cooper | |
| 2003/0004866 | A1 | | 1/2003 | Huennekens et al. | |
| 2007/0136194 | A1 | | 6/2007 | Sloan | |
| 2008/0195530 | A1 | | 8/2008 | Huennekens et al. | |

OTHER PUBLICATIONS

Online Checking Account Benefits, The Reason Why a Secured Charge Card May Work for You, by vette09, Nov. 17, 2010, 3 pages.
Bankrate.com, Credit Cards, 10 questions before getting a secured credit card, Pat Curry, posted Aug. 23, 1999, http://www.bankrate.com/finance/creidt-cards/10-questions-before-getting-a-secured-credit-card-1.aspx, 3 pages.
Bankrate.com, Search Results, Secured Cards, Find the best Secured Cards credit cards, © 2010 Bankrate, Inc., 3 pages.
CreditCardGuide, "Gold Card" Entering Into Second Card Market by Steven Gibbs, Mar. 23, 2010, 1 page.

(Continued)

*Primary Examiner* — James Vezeris
(74) *Attorney, Agent, or Firm* — Banner & Witcoff, Ltd.; Michael A. Springs

(57) ABSTRACT

According to one or more aspects, financial transactions may be conducted using a financial card product, such as a charge card secured through a security interest in an asset. The asset may be the available balance in an interest-bearing checking account (e.g., a DDA account), a brokerage account, or other type of account that may hold funds/assets. The available balance may be monitored in real-time (or near real-time) such that the available spending limit on the secured charge card may be floating (e.g., dynamic). In one example, back-end systems may be configured to monitor in real-time an available balance in security accounts in order to prevent spending over the amount of secured funds. In addition, in some examples, more than one account may be associated with a secured charge card such that the total spending limit on the card is greater. The total spending limit may be calculated through arithmetic (e.g., sum) of the available balance of each of the associated accounts.

18 Claims, 3 Drawing Sheets

OTHER PUBLICATIONS

CreditCardGuide, How to Choose a Secured Credit Card by Eva Norlyk Smith, Ph.D., May 22, 2009, 1 page.
CreditCardGuide, Some New Credit Cards to be Backed by Gold? by Eva Norlyk Smith, Ph.D., Apr. 5, 2010, 2 pages.
CreditCardGuide, Is Secured the New Card for Those Under 21? by Steven Gibbs, Jul. 6, 2009, 1 page.
CreditCardGuide, Prepaid Cards on Steriods by Eva Norlyk Smith, Ph.D., Jan. 11, 2010, 1 page.
CreditCardGuide, How is a Secured Credit Card Different from a Prepaid Card? by Eva Norlyk Smith, Ph.D., May 22, 2009, 1 page.
Visa Debit/Check Card FAQ, ©1996-2011 Visa, 4 pages.
Visa Debit/Check Card Visa Extras @ 1996-2011 Visa, 1 page.

* cited by examiner

SECURED CHARGE CARD

This application claims priority from U.S. Provisional Patent Application Ser. No. 61/436,896, filed on Jan. 27, 2011. The aforementioned provisional patent application is herein incorporated by reference in its entirety.

OVERVIEW

Financial transactions are conducted in a variety of manners. For example, some individuals conduct financial transactions using currency (e.g., cash) while others use checks, while still others use electronic payment devices such as credit cards or debit cards. Unfortunately, those with ample cash or assets, but with a poor credit rating/score, may be prohibited from using some these payment means, such as credit cards. While secured credit cards exist for those with poor or no credit history, those cards typically require the user to provide fixed collateral (e.g, $500) that is maintained in a separate, unusable account that serves as the secured credit card's security interest in the event of nonpayment of outstanding bills up to the amount of the security interest.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, financial transactions may be conducted using a financial card product. The financial card product may be a charge card secured through a security interest in an asset. The asset may be the available balance in an interest-bearing checking account (e.g., a DDA account), a brokerage account, or other type of account that may hold funds/assets (e.g., collateral account). The available balance may be monitored in real-time (or near real-time) such that the available spending limit on the secured charge card may be floating (e.g., dynamic). In some examples, the secured charge card may be associated with an account (e.g., a prefunded account) that does not provide credit protection or protection from exceeding the account balance; meanwhile, in other examples the account may provide such protections in addition to or in lieu of other protections.

In one example, existing front-end point-of-sale terminals (e.g., at a cashier station) and/or ATM terminals may be used without modification with the secured charge card. Rather, backend systems may be configured to monitor in real-time an available balance in security accounts in order to prevent spending over the amount of secured funds.

In addition, in some examples, more than one account may be associated with a secured charge card such that the total spending limit on the card is greater. The total spending limit may be calculated through arithmetic (e.g., sum) of the available balance of each of the associated accounts.

Furthermore, although the term "secured charge card" is used throughout, the meaning of the term is not limited to a physical "plastic" card. Rather, a "card," as used herein, includes but is not limited to an electronic device that may serve the purpose of conveying card information (e.g., card number, expiration date, name, and the like). For example, a mobile phone with short-range wireless communication capabilities (e.g., Bluetooth) may be used as a "secured charge card."

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
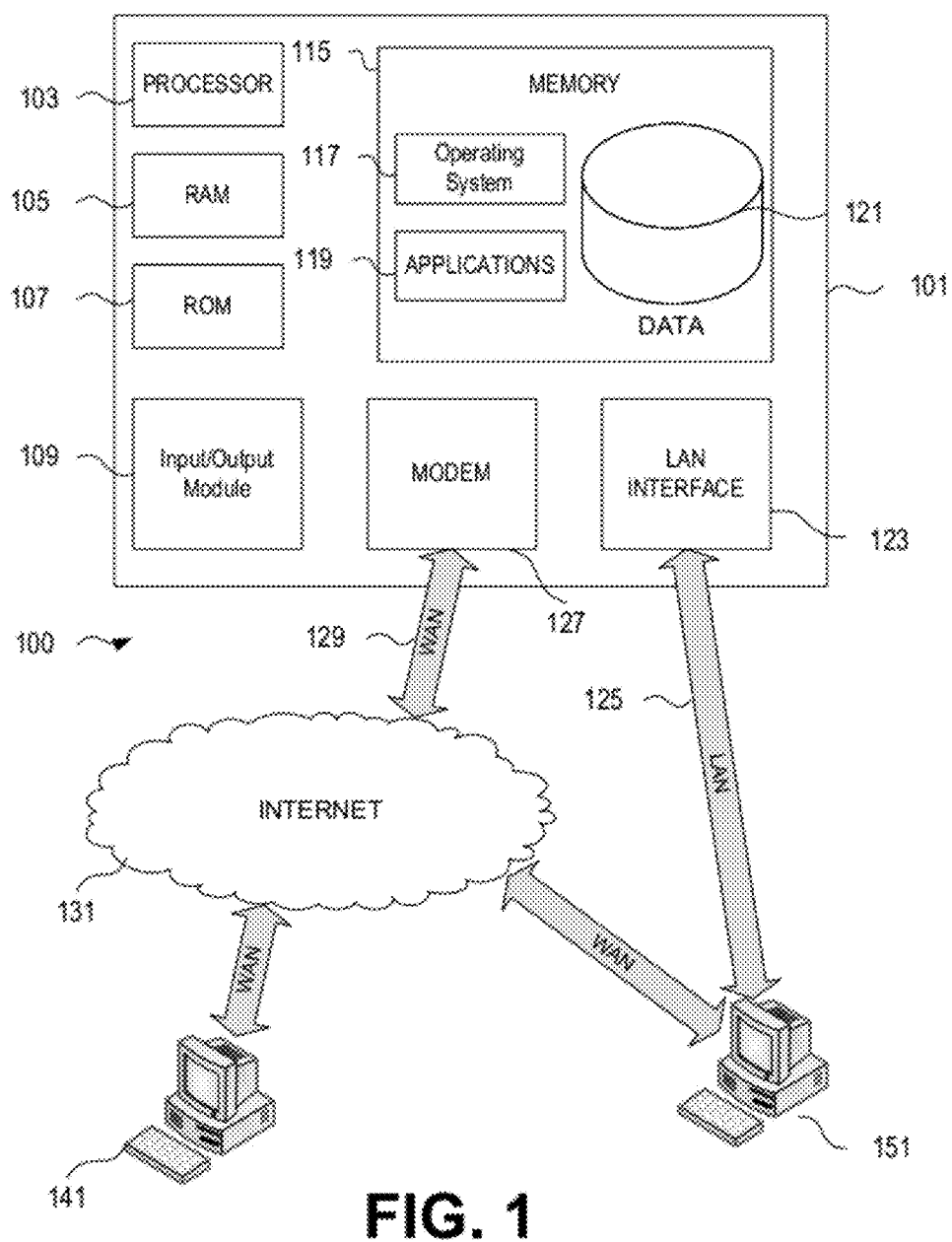
FIG. 1 illustrates an example of a suitable operating environment in which various aspects of the disclosure may be implemented.

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

The disclosure provides a financial product ("a secured charge card) that has features that are different from existing debit and charge cards. The secured charge card provides one or more of the following features: (1) user makes payments monthly, (2) user may pay from any accounts any way they like (e.g., check, autopay, and the like), (3) user's spending line (e.g., credit line) may be secured through their deposit relationship (e.g., as a security interest), and (4) the secured charge card, in some examples, does not debit an asset account through a network (e.g., a deferred debt methodology may be used). The remaining credit line available to a user may be reduced in real time (or near real time) by the customer's spending on the secured charge card. Meanwhile, portions of the user's deposit account may be "secured" to guarantee payment of the secured charge card balance without expressly reducing the account balance. As such, user may continue to earn interest on (or hold assets in) the account through the billing cycle. Upon the payment due date at the end of the billing cycle, the user may pay the balance on the secured charge card, else authorize payment through use of the "secured" funds in the account. The secured charge card may also provide for access to margin for purchasing and payment. Meanwhile, in some examples, ATM transactions may be processed as cash advances. The secured charge card may be implemented, in some embodiments, without requiring new cards be issued to users. Some embodiments of the secured charge card may offer a rewards program, while other embodiments might not.

In one example a secured charge card may be associated with a brokerage account where the account serves as a security interest. Features of the card may include one or more of, but are not limited to: providing a credit line "secured" by a user's brokerage account (or by an account (e.g., a guarantor account) designated by the user, which may or may not belong to the user—e.g., a parent designating her account for her child's secured charge card); providing access to full available balance of the brokerage account; margin may continue to be accessed for purchasing and payment; available balance may be reduced by the user's spend in real time as is currently practiced in the deferred debit platform; spend is "secured" by brokerage account assets; and rewards points may be earned on spend. ATM features of the card may include one or more of, but not limited to: ATM transactions may be processed as cash advances and not directly debit the brokerage account; additional fees or interest may or may not be charged above the current ATM fee program; and users may maintain brokerage access at ATMs. The billing/statement for the secured card product may provide one or more of the following options: auto pay from brokerage account on due date; auto pay from a direct deposit account (DDA) on due date; paper bill with pay by check; separate card statement/bill for all card activity including ATM included with a brokerage account statement mailing; and payment due on 21st of the following month providing 21 day grace period. One of skill in the art will appreciate after review of the entirety disclosed herein that current compliance/regulatory requirements may require that one or more of these options may be mandatory, thus those features may be desirable in embodiments described herein. However, to the extent that the regulatory framework changes or is removed, the disclosure contemplates embodiments where one or more of these options may or may not be included in embodiments in accordance with the disclosure. One or more of the following benefits may be achieved in some examples of the secured card product: minimal disruption in card usage from the current client experience; rewards program may be maintained; user may select both the card and auto pay through a recorded phone call (or via a written agreement or online, electronic acknowledgment); and no replacement card may be required.

In the foregoing example, a secured charge card may be tied to a brokerage account such that the spending limit on the secured card is set by the "cash available" (e.g., available balance) on the account. The "available balance" may be calculated in numerous ways in accordance with the disclosure. For example, the account balance of a DDA account (e.g., a checking account, money market account, savings account, and the like) may be the available balance, assuming no transactions are pending/un-posted on the account. In an account where transactions are pending (e.g., an online bill pay check that is scheduled to be mailed), the available balance may be less than the total cash balance of the account. In addition, in the example of a brokerage account (e.g., a brokerage account used with the trading of stocks/bonds/securities), calculating the available balance may involve determining the current market value of securities/stocks/bonds/ and the like in the account multiplied by the number of shares of each instrument, or some subset of investments in such brokerage accounts. Moreover, in some examples, the available balance may include an availability through a margin line. For example, the available balance may be the total cash in a brokerage account plus the total margin available on the account. In yet another example, a collateral account holding, for example, a certificate of deposit may provide the available balance. In addition, in another example, multiple accounts may be designated as a security interest for the secured card. For example, a first account may be designated as the primary account, and a second account may be designated as the secondary account into which the security interest may extend if the available balance in the primary account is inadequate. In another example, an account belonging to another person/entity may be used as security interest, such as a parent providing a secured charge card for their son/daughter.

Figure 2:
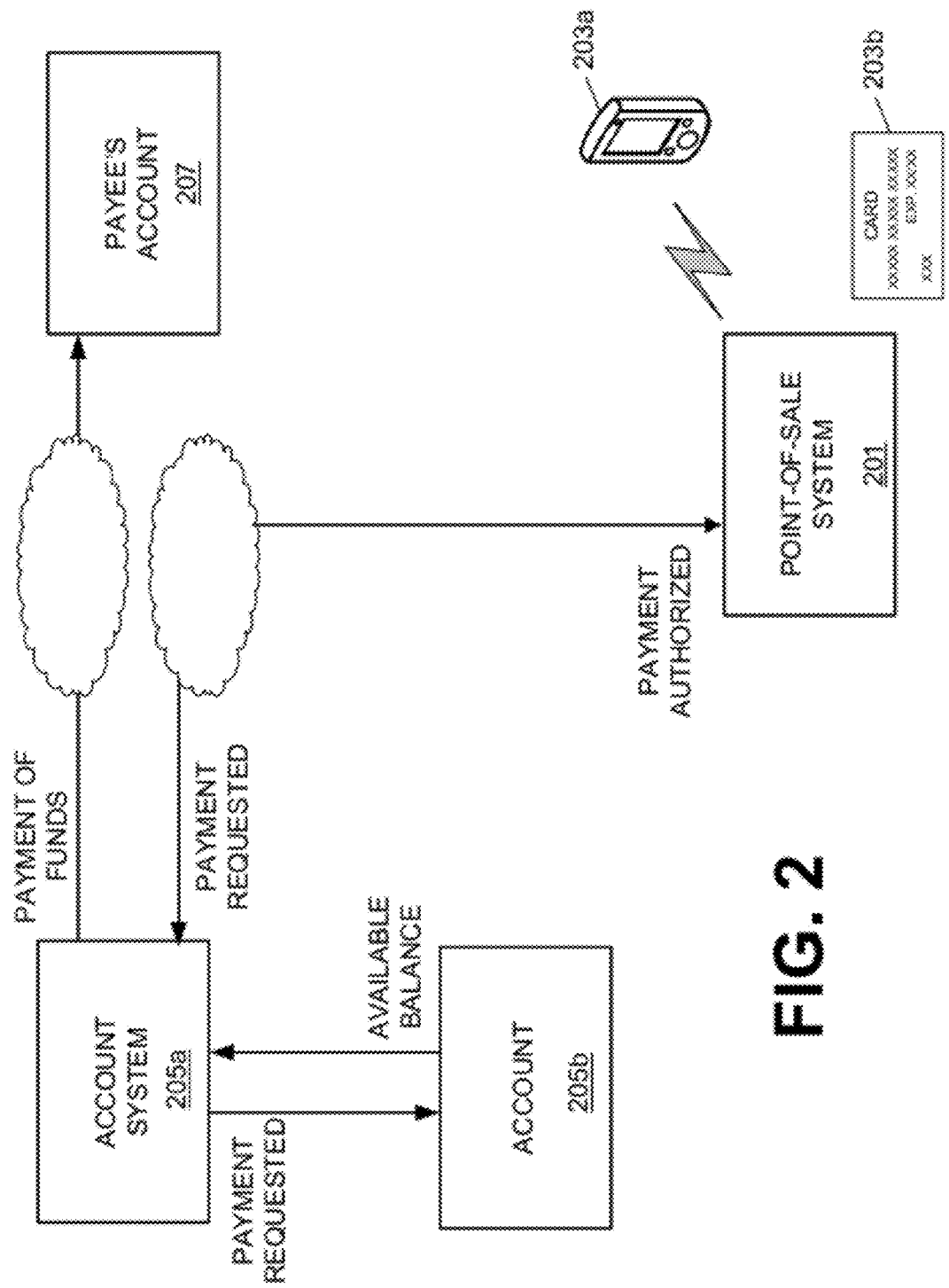
FIG. 2 illustrates an example of a POS payment processing system in which various aspects of the disclosure may be implemented.

FIG. 2 illustrates a payment processing environment in which a consumer or customer may use a secured charge card (e.g., mobile phone 203*a*, card 203*b*, and the like) at a point-of-sale (POS) system 201, to pay one or more bills or purchase products/services. For example, a user may approach a POS terminal (e.g., system 201) in order to pay a grocer bill (e.g., grocer charge) to payee 207. The user may choose to use a secured charge card 203*b* or another payment device such as a mobile communication device 203*a* (e.g., a mobile phone with short-range wireless communication means). In one or more arrangements, the POS system 201 may contact an account system 205*a* to process the payment. The account system 205*a* may be operated by and/or belong to a financial institution (e.g., bank, credit union, and the like) that is responsible for an account 205*b* associated with a secured charge card 203*a*, 203*b*. The account system 205*a* may compare the amount of the payment requested with the available balance on the account 205*b*. In one example, the available balance may be maintained in real-time such that instant confirmation/denial (i.e., nearly instantaneous approval/denial) may be determined. If the requested payment is authorized, the recipient of the payment (i.e., payee 207) may be provided with a payment of funds. One skilled in the art will appreciate that payment to the payee 207 may not be instantaneous in all examples; in some examples, the payment (e.g., posting) may occur on a daily basis or at some other interval of time. Meanwhile, if the requested payment is denied, the account system 205*a* may provide, in some examples, an explanation for the denial (e.g., a message to the user/cashier indicating that the charge would put the secured charge card over its current spending limit.) In some examples, the message may be sent to the POS system 201 for immediate display to the user/cashier. Alternatively, the message may be sent through a different channel (e.g., via a SMS to the user's phone number, via a letter to the user's home address, via e-mail to the user's e-mail account, and the like) to the user.

As explained above, account 205*b* associated with a secured charge card 203*a*, 203*b* may comprise multiple accounts and/or multiple different types of accounts. For example, multiple accounts 205*b* may be designated as a security interest for a secured card. A first account of the multiple accounts 205*b* may be designated as a primary account, and a second account of the multiple accounts 205*b* may be designated as a secondary account into which the security interest may extend if the available balance in the primary account is inadequate. In one example, account system 205*a* may achieve improved efficiency because it may calculate the available balance for only the first account, and not expend resources calculating the available balance of other accounts unless it becomes necessary to extend into those accounts. In other examples, the account system 205*a* may calculate the available balance over all of the multiple accounts 205*b* regardless of a sufficient available balance in the first account. Such an approach may be useful when its desirable to determine the total available spending limit on a secured charge card 203*a*, 203*b* without necessarily posting a purchase against the card.

Figure 3:
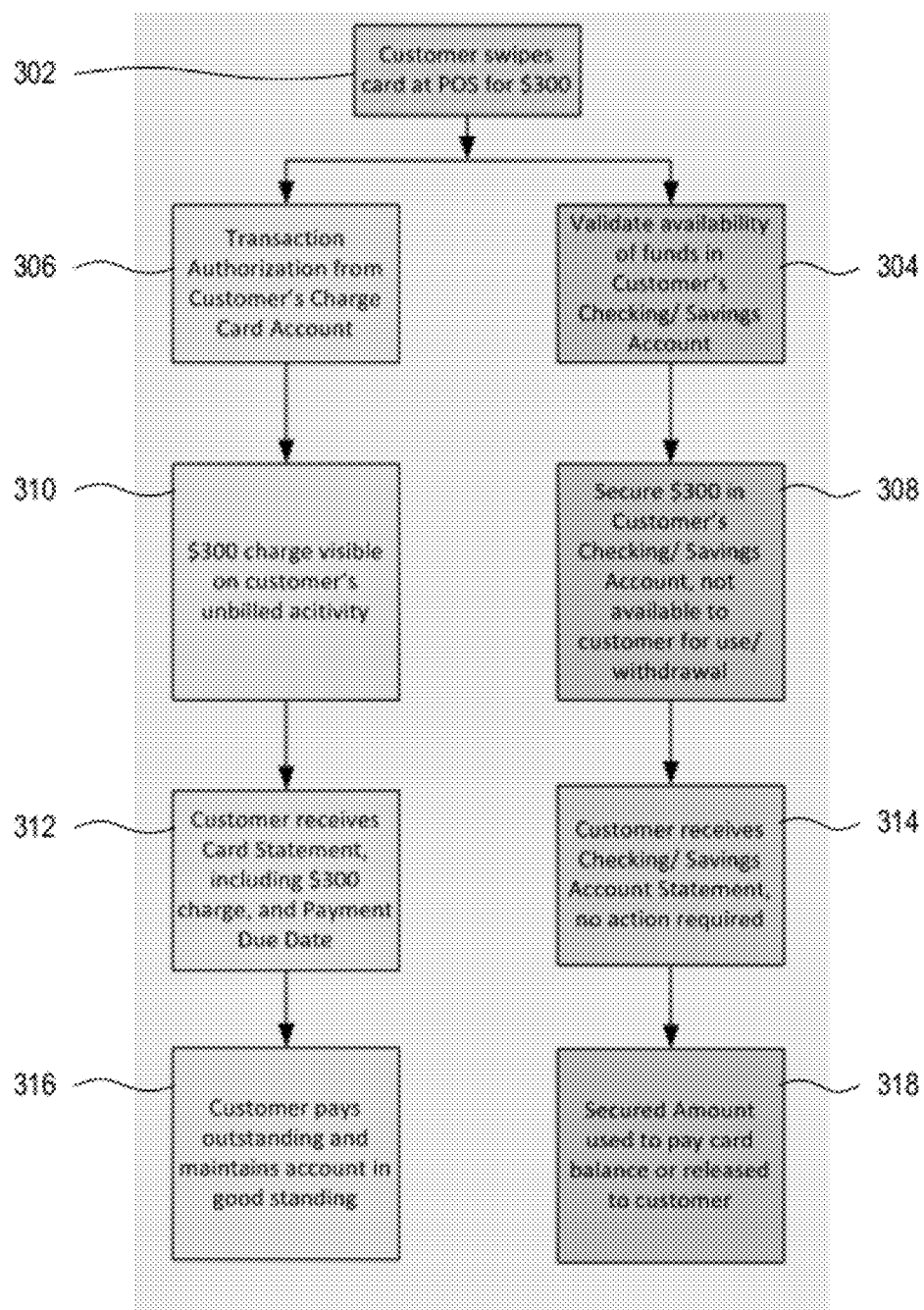
FIG. 3 illustrates a flow of some illustrative processing of a secured charge card in accordance with various aspects of the disclosure.

In various embodiments in accordance with aspects of the disclosure, known deferred debit methodologies may be used by a backend account system 205*a* to implement aspects of the secured card feature. For example, a bill may be sent to a user of a secured charge card at the end of a billing cycle (e.g., end of the month). The funds in the user's account may be locked (e.g., secured), but still available to accrue interest or provide other benefits (e.g., dividends, and the like) As illustrated in FIG. 3, if the user pays the bill (with whatever means he/she desires) before the final due date of the bill, the funds that were previously locked/secured are freed/released. However, if the user fails to pay, the funds in the account may be automatically withdrawn and applied against the outstanding bill.

In some examples the secured charge card product may implement a modified settlement process in accordance with aspects of a deferred debit methodology. That modified settlement may support the sweeping and/or release of held assets. In one example, Customer A may withdraw $400 from ATM using a secured charge card line. The card is secured to customer's DDA account. The DDA account has $1,000 balance prior to the transaction. As a result of the transaction, Customer A gets $400 cash, but available balance is reduced to $600 (no fee). Meanwhile, on the backend account system 205a, a real-time check against balance may occur, a hold may be placed on balance of secured account for $400 (i.e., the amount withdrawn), and approval of transaction may be sent to the ATM.

Referring to FIG. 3, Customer B may make a $300 POS transaction (e.g., by using in step 302 the secured charge card at a grocery store). The card is secured to customer's DDA/brokerage account. The DDA/brokerage account has $600 available balance prior to the transaction. The card may be treated as a regular credit card by the cashier, and no PIN may be required of Customer B. Meanwhile, on the backend account system 205a, a fraud check may be performed (optionally), a real-time check against balance may occur (see FIG. 3, step 304), a hold may be placed on a balance of secured account for $300 (DDA/brokerage) (see FIG. 3, step 308), and an indication of approval of the transaction may be sent (see FIG. 3, step 306). As a result, the available balance on the customer's account available for security for subsequent transactions on the secured charge card may be reduced to the remaining $300 available balance. However, the customer's DDA/brokerage account statement, in one example, will remain unchanged (i.e., the assets in the account will not show as liquidated or sold.) In another example, the statement may show the amount of funds being secured (e.g., locked) due to the secured charge card's outstanding balance. At a later time, Customer B may be sent a bill for the secured charge card, which states a $300 amount outstanding and a payment due date (see FIG. 3, steps 310 and 312). Referring to FIG. 3, Customer B may either pay the bill (see FIG. 3, step 316) using an account of her choice (e.g., another account with the financial institution, paper check, cash, and the like), else the system may automatically remove the funds (see FIG. 3, step 318) from the associated DDA/brokerage account (e.g., the held assets would be liquidated and applied against the bill.) When the customer's payments have been applied against the outstanding bill, the account system 205a may release the hold (e.g., lock) on the particular assets/funds and increase the available balance on the account accordingly. As a result, the spending limit on the customer's secured charge card may also be adjusted. In another example, if the customer causes a credit to be applied against their outstanding bill (e.g., if they return an item they purchased at the store the day before using their secured charge card), the available balance in their account will reflect an increase as well. Likewise, the spending limit on their secured charge card may also increase.

In another example, the secured charge card may be configured (through, for example, business rules created on the account system 205a) to require no or less than full security for particular purchases. For example, a secured charge card used to purchase certain types of lower risk items or items that retain their intrinsic value (e.g., gold) may require only half of the purchase price of the item to be secured (e.g., held) in the user's account. In another example, the percentage or amount of security required may be adjusted based on the credit rating/score of a person or other factors. For example, if a user is consistent in making timely payments of their secured charge card, over time the percentage of security required may be reduced. In yet another example, a financial institution may designate a base amount (e.g., $1,000) and permit a user to spend on the secured charge card up to that amount without causing a hold on assets in the user's account. After the base amount has been reached, any subsequent charges on the secured charge card may require the user to have a sufficient available balance in their account to act as a security interest against the charge.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The methods and features recited herein may further be implemented through any number of tangible computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like. The computer-readable instructions may be executed by a processor/device (e.g., the computing device 101) to perform one or more of the steps described herein.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

I claim:

1. A method comprising:
providing a secured charge card to a user, wherein the secured charge card is secured through a security interest in assets, and wherein the security interest is in a brokerage account of the user and extends to a margin line available to the user;
receiving, using a computer network, a request for approval of a transaction of the secured charge card user, wherein the request for approval comprises a monetary amount;
validating, using a computer processor, an available balance of the assets, including determining that the monetary amount of the request for approval is less than the available balance;
securing, using the computer processor, no more than the monetary amount against the assets; and
sending, using the computer network, an approval of the transaction in response to the request for approval.

2. The method of claim 1, wherein the validating includes:
calculating, using the computer processor, an available balance of the brokerage account and the margin line by determining a market value of all assets in the brokerage account and an availability of funds through the margin line.

3. The method of claim 1, wherein the validating is performed in real-time, and a determination of approval or denial of the transaction is nearly instantaneous.

4. A method comprising:
providing a secured charge card to a user, wherein the secured charge card is secured through a security interest in assets, and wherein the security interest is in multiple accounts of the user, wherein a first account of the multiple accounts is a primary account and a second account of the multiple accounts is a secondary account into which the security interest extends when an available balance in the first account exceeds an account is inadequate;
receiving, using a computer network, a request for approval of a transaction of the secured charge card user, wherein the request for approval comprises a monetary amount;
validating, using a computer processor, an available balance of the assets, including determining that the monetary amount of the request for approval is less than the available balance;
securing, using the computer processor, no more than the monetary amount against the assets; and
sending, using the computer network, an approval of the transaction in response to the request for approval.

5. A method comprising:
providing a secured charge card to a user, wherein the secured charge card is secured through a security interest in assets, and wherein the secured charge card is provided to the user, but the assets through which the secured charge card is secured are owned by a guarantor of the user;
receiving, using a computer network, a request for approval of a transaction of the secured charge card user, wherein the request for approval comprises a monetary amount;
validating, using a computer processor, an available balance of the assets, including determining that the monetary amount of the request for approval is less than the available balance;
securing, using the computer processor, no more than the monetary amount against the assets; and
sending, using the computer network, an approval of the transaction in response to the request for approval.

6. The method of claim 1, wherein the securing of the monetary amount against the assets does not interrupt accrual of interest payments in the assets, and does not liquidate the assets held in the brokerage account.

7. The method of claim 1, wherein the available balance is adjusted upwards when items purchased using the secured charge card are returned and a credit is applied against outstanding charges on the secured charge card.

8. The method of claim 1, comprising:
sending a bill to the user for purchases made using the secured charge card during an interval of time;
determining, using the computer processor, that the bill has not been paid; and
liquidating a portion of the assets to apply towards the unpaid bill, wherein the portion equals an amount of the bill that has not been paid.

9. The method of claim 1, comprising:
sending a bill to the user for purchases made using the secured charge card during an interval of time;
determining, using the computer processor, that the bill has been paid; and
releasing a portion of the assets secured against the unpaid bill.

10. The method of claim 1, wherein less than the monetary amount is secured against the assets in the securing step when an item being purchased using the secured charge card retains its intrinsic value.

11. The method of claim 1, wherein less than the monetary amount is secured against the assets in the securing step based on a credit rating of the user.

12. The method of claim 1, wherein the secured charge card is embodied in a mobile communications device.

13. A non-transitory computer-readable medium storing computer-executable instructions, which when executed by a processor, cause the processor to perform steps comprising:
   receiving a request for approval of a transaction of a user of a secured charge card, wherein the request for approval comprises a monetary amount, wherein the secured charge card is secured through a security interest in assets, and wherein the security interest is in a brokerage account of the user and extends to a margin line available to the user;
   validating, using a computer processor, an available balance of the assets, including determining that the monetary amount of the request for approval is less than the available balance;
   securing, using the computer processor, no more than the monetary amount against the assets; and
   sending an approval of the transaction in response to the request for approval.

14. The computer-readable medium of claim 13, wherein the validating includes calculating an available balance of the brokerage account and the margin line by determining a market value of all assets in the brokerage account and an availability of funds through the margin line.

15. The computer-readable medium of claim 13, wherein less than the monetary amount is secured against the assets in the securing step when an item being purchased using the secured charge card retains its intrinsic value or is a low risk item.

16. An apparatus, comprising:
   at least one processor; and
   a memory storing instructions that when executed by the at least one processor cause the apparatus to:
      register a secured charge card to a user, wherein the secured charge card is secured through a security interest in assets, and wherein the security interest is in a brokerage account of the user and extends to a margin line available to the user;
      receive a request for approval of a transaction of the secured charge card user, wherein the request for approval comprises a monetary amount;
      validate an available balance of the assets by determining that the monetary amount of the request for approval is less than the available balance;
      secure no more than the monetary amount against the assets; and
      send an approval of the transaction in response to the request for approval.

17. An apparatus, comprising:
   at least one processor; and
   a memory storing instructions that when executed by the at least one processor cause the apparatus to:
      register a secured charge card to a user, wherein the secured charge card is secured through a security interest in assets, and wherein the security interest is in multiple accounts of the user, wherein a first account of the multiple accounts is a primary account and a second account of the multiple accounts is a secondary account into which the security interest extends when an available balance in the first account is inadequate;
      receive a request for approval of a transaction of the secured charge card user, wherein the request for approval comprises a monetary amount;
      validate an available balance of the assets by determining that the monetary amount of the request for approval is less than the available balance;
      secure no more than the monetary amount against the assets; and
      send an approval of the transaction in response to the request for approval.

18. An apparatus, comprising:
   at least one processor; and
   a memory storing instructions that when executed by the at least one processor cause the apparatus to:
      register a secured charge card to a user, wherein the secured charge card is secured through a security interest in assets, and wherein the secured charge card is provided to the user, but the assets through which the secured charge card is secured are owned by a guarantor of the user;
      receive a request for approval of a transaction of the secured charge card user, wherein the request for approval comprises a monetary amount;
      validate an available balance of the assets by determining that the monetary amount of the request for approval is less than the available balance;
      secure no more than the monetary amount against the assets; and
      send an approval of the transaction in response to the request for approval.

* * * * *

UNITED STATES PATENT AND TRADEMARK OFFICE
CERTIFICATE OF CORRECTION

PATENT NO. : 8,458,094 B2
APPLICATION NO. : 13/221674
DATED : June 4, 2013
INVENTOR(S) : James K. Macklin It is certified that error appears in the above-identified patent and that said Letters Patent is hereby corrected as shown below:

In the Claims

In Column 8, Claim 4, Line 9:
    Please delete "exceeds an account".

In Column 8, Claim 9, Line 66:
    Please delete "unpaid".

Signed and Sealed this
Seventh Day of October, 2014

Michelle K. Lee
*Deputy Director of the United States Patent and Trademark Office*